(12) United States Patent
Kitamura et al.

(10) Patent No.: US 6,984,032 B2
(45) Date of Patent: *Jan. 10, 2006

(54) INK COMPOSITION, INK SET, RECORDING PROCESS AND RECORDED MATTER

(75) Inventors: Kazuhiko Kitamura, Nagano (JP); Hiroshi Fukumoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

This patent is subject to a terminal disclaimer.

(21) Appl. No.: 10/651,304

(22) Filed: Aug. 28, 2003

(65) Prior Publication Data

US 2004/0174420 A1    Sep. 9, 2004

(30) Foreign Application Priority Data

Aug. 30, 2002  (JP)  ............................ P2002-254611

(51) Int. Cl.
*B41J 2/01* (2006.01)
(52) U.S. Cl. ...................... 347/100; 347/95; 106/31.47
(58) Field of Classification Search ................ 347/100, 347/96, 95, 101; 106/31.27, 31.47, 31.48, 106/31.6, 31.13; 523/160
See application file for complete search history.

(56) References Cited

U.S. PATENT DOCUMENTS 6,852,154 B2 * 2/2005 Kitamura et al. ......... 106/31.47
2004/0239739 A1 * 12/2004 Matsumoto et al. ........ 347/100

FOREIGN PATENT DOCUMENTS

WO    WO 03/027185 A1    3/2003

* cited by examiner

*Primary Examiner*—Manish S. Shah
(74) *Attorney, Agent, or Firm*—Ladas and Parry LLP

(57) ABSTRACT

The present invention provides an ink composition including at least water; at least one member selected from compounds represented by the following formula (1) and/or salts thereof; and at least one member selected from carboxyl group-containing aromatic compounds and/or salts thereof:

(1)

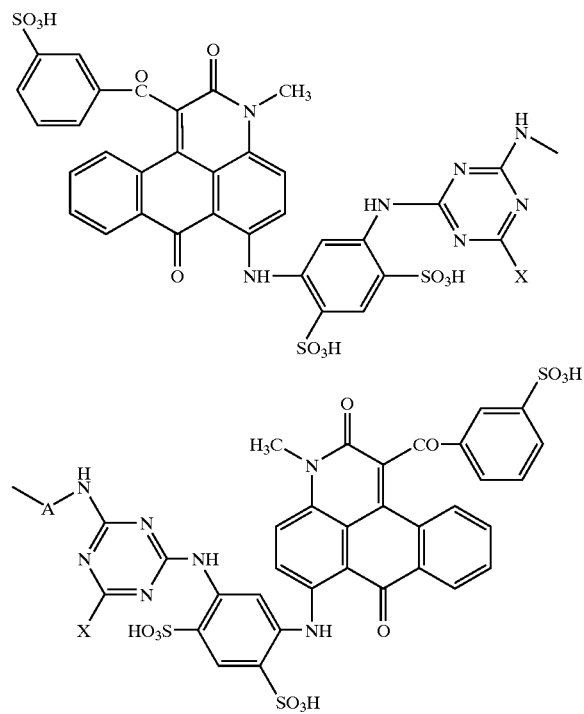

wherein A represents an alkylene group, a phenylene group-containing alkylene group or

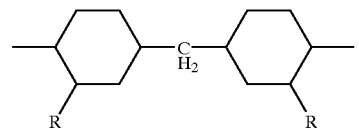

(R means hydrogen or alkyl) and X represents $NH_2$, OH or Cl.

19 Claims, No Drawings

INK COMPOSITION, INK SET, RECORDING PROCESS AND RECORDED MATTER

FIELD OF THE INVENTION

The present invention relates to an ink composition excellent in light resistance and moisture resistance, an ink set comprising the ink composition, a recording process using the ink composition or the ink set, and recorded matter.

BACKGROUND OF THE INVENTION

Ink jet recording is a process in which an ink composition are ejected as droplets through minute nozzles to record letters or images (hereinafter also simply referred to as images) on surfaces of recording media. Ink jet recording systems put into practical use include a process in which an electric signal is converted to a mechanical signal by the use of an electrostrictive element to intermittently ejecting an ink composition stored in a nozzle head section, thereby recording letters or images on a surface of a recording medium; and a process in which an ink composition stored in a nozzle head section is rapidly heated at a portion very close to an ejection portion to generate bubbles, and the ink composition is intermittently ejected by volume expansion due to the bubbles to record letters or images on a surface of a recording medium.

Further, the ink composition for ink jet recording is generally a solution of various dyes in water, an organic solvent or a mixture thereof, and requires severer requirements than an ink composition for writing materials such as a fountain pen and a ball point pen in terms of stability and printing characteristics.

In view of the fact that ink jet printers have recently been employed for the preparation of printed matter for advertisement, even severer requirements have come to be required in forming a color image using a plurality of ink compositions.

The reason for this is that when even one color inferior in hue exists in the color image formed by the plurality of ink compositions, the hue causes poor color balance as the whole image, resulting in the difficulty of obtaining a high-quality image.

In particular, "photographic image quality" printing with color ink jet printers has reached a level not inferior to that of "silver salt photographs" and has also become "equivalent to photographs" in image quality by successive improvements of heads, ink compositions, recording processes and media, respectively. On the other hand, keeping quality of images obtained has also been improved by improvements of ink compositions and media. In particular, light resistance has been improved to a level having practically no problem. However, it does not reach a level comparable to the silver salt photographs. As for evaluation of the ability of light resistance, judgments have normally been made using the color fading rate of a pure color pattern (the optical density is about 1.0) of each of Y, M and C as an index. With respect to the ability of heat resistance of ink compositions carried by printers commercially available on the market at present, the ability of magenta ink compositions is lowest when judged using the above-mentioned evaluation technique. Accordingly, it leads to improvement in the light resistance of images equivalent to photographs to improve the light resistance of the magenta compositions.

From such a viewpoint, the present inventors have provided ink sets containing magenta ink compositions improved in the light resistance of images equivalent to photographs by using compounds having specific structures as colorants for the magenta ink compositions (Japanese Patent Application Nos. 2002-120069 and 2002-120070).

In subsequent studies, the present inventors have added a carboxyl group-containing aromatic compound or a salt thereof to the above-mentioned compounds having the specific structures. As a result, the present inventors have known that moisture resistance of the images is also improved.

SUMMARY OF THE INVENTION

The invention has been made based on the finding as described above, and an object of the invention is to provide an ink composition which can record an image excellent in light resistance and moisture resistance.

Another object of the invention is to provide an ink set containing the ink composition. A still other object of the invention is to provide a recording process using the ink set. A yet still other object of the invention is to provide recorded matter recorded by the ink set.

Other objects and effects of the invention will become apparent from the following description.

The above-mentioned objects of the invention have been attained by providing an ink composition, a recording process and recorded matter having the following constitutions.

1. An ink composition according to the invention comprising at least water; at least one member selected from compounds represented by the following formula (1) and/or salts thereof; and at least one member selected from carboxyl group-containing aromatic compounds and/or salts thereof:

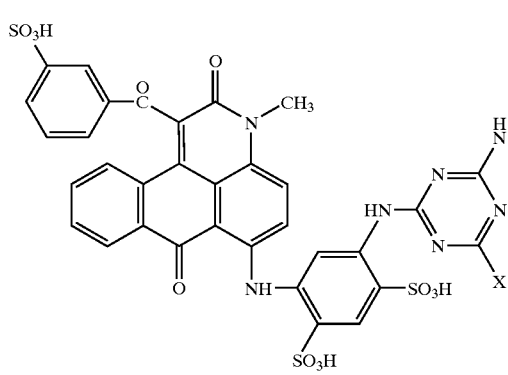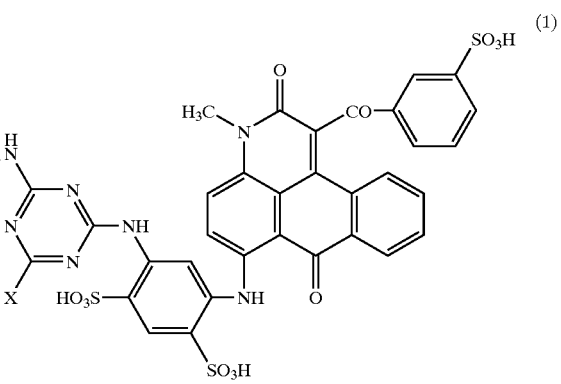

(1)

wherein A represents an alkylene group, a phenylene group-containing alkylene group or

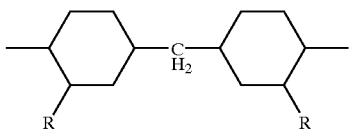

(R means hydrogen or alkyl) and X represents NH$_2$, OH or Cl.

2. In the above 1, the ink composition according to the invention preferably contains the compound represented by formula (1) and/or salt thereof in an amount of 0.2 to 10% by weight based on the total amount of the ink composition.

3. In the above 1 or 2, the ink composition according to the invention preferably contains the carboxyl group-containing aromatic compound and/or salt thereof in an amount of 0.2 to 10% by weight based on the total amount of the ink composition.

4. In the ink composition according to the invention in any one of the above 1 to 3, the content ratio of the compound represented by formula (1) and/or salt thereof to the carboxyl group-containing aromatic compound and/or salt thereof is preferably from 4:1 to 1:10.

5. In the ink composition according to the invention in any one of the above 1 to 4, the carboxyl group-containing aromatic compound and/or salt thereof is preferably a naphthalene skeleton-containing compound and/or a salt thereof.

6. In the ink composition according to the invention in the above 5, the naphthalene skeleton-containing compound and/or salt thereof is preferably a compound having a carboxyl group at the 2-position and/or a salt thereof.

7. In the ink composition according to the invention in the above 6, the compound having a carboxyl group at the 2-position and/or salt thereof is preferably at least one of 2-naphthoic acid, 3-hydroxy-2-naphthoic acid, 6-hydroxy-2-naphthoic acid, 4-hydroxy-benzoic acid, 6-methoxy-2-naphthoic acid and salts thereof.

8. In the ink composition according to the invention in any one of the above 1 to 7, the salt of the carboxyl group-containing aromatic compound is preferably a lithium salt.

9. In the ink composition according to the invention in the above 8, the carboxyl group-containing aromatic compound and/or salt thereof is preferably lithium 2-naphthoate, lithium 3-hydroxy-2-naphthoate, lithium 6-hydroxy-2-naphthoate, lithium 4-hydroxy-benzoate or lithium 6-methoxy-2-naphthoate.

10. In any one of the above 1 to 9, it is preferred that the ink composition according to the invention further contains a nonionic surfactant.

11. In the ink composition according to the invention in the above 10, the nonionic surfactant is preferably an acetylene glycol-based surfactant.

12. In the above 10 or 11, the ink composition according to the invention preferably contains the nonionic surfactant in an amount of 0.1 to 5% by weight based on the total amount of the ink composition.

13. In any one of the above 1 to 12, it is preferred that the ink composition according to the invention further contains a penetration accelerator.

14. In the ink composition according to the invention in the above 13, the penetration accelerator is preferably a glycol ether.

15. In any one of the above 1 to 14, the ink composition according to the invention preferably has a pH of 8.0 to 10.5 at 20° C.

16. In any one of the above 1 to 15, the ink composition according to the invention is preferably used in an ink jet recording process.

17. In any one of the above 1 to 16, the ink composition according to the invention is preferably a magenta ink composition.

18. An ink jet recording process according to the invention comprises ejecting a droplet of an ink composition, and depositing the droplet onto a recording medium to perform printing, wherein the ink composition is one described in any one of the above 1 to 17.

19. Recorded matter according to the invention is recorded matter recorded using an ink composition described in any one of the above 1 to 17.

DETAILED DESCRIPTION OF THE INVENTION

The ink composition of the invention comprises at least a compound represented by the above-mentioned formula (1) (including a salt thereof, the description of which is hereinafter omitted) as a colorant and a carboxyl group-containing aromatic compound (including a salt thereof, the description of which is hereinafter omitted) as a moisture resistance improver in water or an aqueous medium comprising water and a water-soluble organic solvent, and may further comprise a humectant, a viscosity modifier, a pH adjustor and other additives as needed.

The compound represented by the above-mentioned formula (1), which is used in the invention, may be produced by any method, but can also be produced, for example, by a method described below.

(1) Benzoylacetic acid ethyl ester is reacted with 1-methylamino-4-bromoanthraquinone in a solvent to obtain 1-benzoyl-6-bromo-2,7-dihydro-3-methyl-2,7-dioxo-3H-dibenzo[f,ij]isoquinoline.

(2) Then, the compound obtained in the above (1) is reacted with m-aminoacetanilide in a solvent to obtain 3'-[1-benzoyl-2,7-dihydro-3-methyl-2,7-dioxo-3H-dibenzo[f,ij]isoquinoline-6-ylamino]acetanilide.

(3) Subsequently, the compound obtained in the above (2) is reacted in fuming sulfuric acid to obtain trisodium 6-amino-4-[2,7-dihydro-3-methyl-1-(3-sulfonatobenzoyl)-2,7-dioxo-3H-dibenzo[f,ij]isoquinoline-6-ylamino]benzene-1,3-disulfonate.

(4) After that, the compound obtained in the above (3) is reacted with cyanuric chloride in water to obtain a primary condensation product, which is further reacted with a diamine having a connecting group A to obtain a secondary condensation product.

(5) Then, the compound obtained in the above (4) is condensed as such, or hydrolyzed or reacted with ammonia to prepare a tertiary condensation product, thereby obtaining the desired compound represented by the above-mentioned formula (1).

In the invention, as the colorant used in the ink composition, there can be used a single kind of compound selected from the compounds represented by the above-mentioned formula (1). However, a plural kind of compounds selected therefrom may be used.

The ink composition containing the compound represented by the above-mentioned formula (1) is excellent in light resistance, compared to an ink composition containing a magenta dye which has conventionally been used.

The concentration of the colorant contained in the ink composition can be appropriately selected according to the color value of the compound represented by formula (1), which is used as the colorant. However, it is preferred that the ink composition usually contains the compound represented by formula (1) in an amount of 0.2 to 10% by weight. When the content is 0.2% by weight or more, color development can be secured. When the content is 10% by weight or less, properties to be satisfied as the ink jet composition and reliability such as reliability in terms of clogging are easily secured.

Further, in the invention, a magenta ink composition as a matter of course, and even an ink composition having a color different from magenta such as a black ink composition or a dark yellow ink composition can be improved in moisture resistance by using the carboxyl group-containing compound together, as long as the ink composition contains the compound represented by the above-mentioned formula (1). In order to prepare these various ink compositions, dyes which have hitherto been known can be used together.

In the invention, the carboxyl group-containing aromatic compound used in the ink composition as the moisture resistance improver may be any, as long as it is an aromatic compound having at least one carboxyl group in its molecular structure. As the salt thereof, preferred is an alkali metal salt, and a lithium salt is particularly preferred among others in terms of clogging resistance. Further, a naphthalene skeleton-containing compound having a carboxyl group at the 2-position and/or a salt thereof is preferred, and more preferred examples thereof include an alkali metal salt (particularly, a lithium salt) of a naphthalene skeleton-containing compound having a carboxyl group at the 2-position.

Specific examples of the carboxyl group-containing aromatic compounds include 2-naphthoic acid, 3-hydroxy-2-naphthoic acid, 6-hydroxy-2-naphthoic acid, 4-hydroxybenzoic acid, 6-methoxy-2-naphthoic acid and salts thereof (particularly, lithium salts thereof).

Although the content of the carboxyl group-containing aromatic compound is determined depending on the kind of carboxyl group-containing aromatic compound, the kind of dye, the kind of solvent ingredient, etc., it ranges from 0.2 to 10% by weight, and preferably from 0.5 to 5% by weight, based on the total weight of the ink composition.

In the ink composition of the invention, the content ratio of the compound represented by the above-mentioned formula (1) to the carboxyl group-containing aromatic compound is preferably from 4:1 to 1:10, more preferably from 2:1 to 1:6, and still more preferably from 1:1 to 1:4. The effect of improving moisture resistance is sufficiently obtained by increasing the ratio of the carboxyl group-containing aromatic compound to more than 4:1, and ejection characteristics and reliability against clogging can be easily secured by decreasing the ratio of the carboxyl group-containing aromatic compound to less than 1:10.

When the aqueous medium is acidic, the solubilities of the compound represented by the above-mentioned formula (1) and the carboxyl group-containing aromatic compound are lowered. Accordingly, in order to stably dissolve required amounts of the compound represented by the above-mentioned formula (1) and the carboxyl group-containing aromatic compound, the pH (at 20° C.) of the ink composition is preferably 8.0 or more. Further, considering resistance properties to various materials with which the ink composition comes into contact, the pH of the ink composition is preferably 10.5 or less. In order to allow these matters to be compatible, it is more preferred that the pH of the ink composition is adjusted to 8.5 to 10.0.

In the ink composition of the invention, water or a mixed solution of water and a water-soluble organic solvent is preferably used as a main solvent.

As the water, there can be used ion-exchanged water, ultrafiltrated water, reverse osmosis-treated water, distilled water or the like. From the viewpoint of long-term storage, water subjected to various chemical sterilization treatments such as ultraviolet irradiation and addition of hydrogen peroxide is preferred.

In the ink composition of the invention, the content of the water used as the main solvent is preferably from 50 to 90% by weight, and more preferably from 60 to 80% by weight, based on the total weight of the ink composition.

The ink composition of the invention can further contain a humectant selected from water-soluble organic solvents having a vapor pressure lower than that of pure water and/or saccharides.

In the ink jet recording system, the inclusion of the humectant can inhibit the evaporation of water to retain moisture. Further, in the case of the water-soluble organic solvent, ejection stability can be improved, or viscosity can be easily altered without changing ink characteristics.

The water-soluble organic solvent means a medium capable of dissolving a solute, and is selected from water-soluble solvents which are organic and have a vapor pressure lower than that of water. Specifically, preferred examples thereof include polyhydric alcohols such as ethylene glycol, propylene glycol, butanediol, pentanediol, 2-butene-1,4-diol, 2-methyl-2,4-pentanediol, glycerol, 1,2,6-hexanetriol, diethylene glycol, triethylene glycol and diproylene glycol; ketones such as acetonylacetone; esters such as triethyl phosphate; furfuryl alcohol, tetrahydrofurfuryl alcohol and thiodiglycol.

Further, preferred.examples of the saccharides include maltitol, sorbitol, gluconic lactone and maltose.

The humectant is added preferably in an amount of 5 to 50% by weight, more preferably in an amount of 5 to 30% by weight, and still more preferably in an amount of 5 to 20% by weight, based on the total amount of the ink composition. When the humectant is added in an amount of 5% by weight or more, moisture retention is obtained. Further, 50% by weight or less results in easy adjustment to viscosity used in ink jet recording.

It is preferred that the ink composition of the invention contains a nonionic surfactant as an additive effective for obtaining rapid fixing (permeability) of the ink and keeping the circularity of one dot.

The nonionic surfactants used in the invention include, for example, acetylene glycol-based surfactants. Specific examples of the acetylene glycol-based surfactants include Surfynol 465, Surfynol 104 and Olfin STG (trade names, manufactured by Nissin Chemical Industry Co., Ltd.). The amount thereof added is from 0.1 to 5% by weight, and preferably from 0.5 to 2% by weight, based on the total amount of the ink composition. Addition of the nonionic surfactant in an amount of 0.1% by weight or more allows sufficient permeability to be obtained. Further, 5% by weight or less results in easy prevention of the occurrence of blurring in images.

Furthermore, in addition to the nonionic surfactant, a glycol ether can be added as a penetration accelerator, thereby increasing permeability and decreasing bleeding at the boundary between adjacent color inks in color printing to obtain very clear images.

The glycol ethers used in the invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether and triethylene glycol monobutyl ether. The amount thereof added is from 3 to 30% by weight, and preferably from 5 to 15% by weight, based on the total amount of the ink composition. Addition of the glycol ether in an amount of 3% by weight or more allows the sufficient bleed preventing effect to be obtained. Further, 30% by weight or less results in easy prevention of the occurrence of blurring in images, and easy securing of keeping stability of the ink.

Further, a pH adjuster such as triethanolamine or a hydroxide of an alkali metal, a hydrotropy agent such as urea or a salt thereof, a water-soluble polymer such as sodium alginate, a water-soluble resin, a fluorine surfactant, an antifungal agent, a corrosion inhibitor or the like may be added to the ink composition of the invention as needed.

In the ink composition of the invention, the optional ingredients described above may be used alone or as a mixture of a plurality of optional ingredients selected from the same category or different categories.

Further, in the ink composition of the invention, the amounts of all ingredients of the ink composition are preferably selected so that the viscosity of the ink composition is less than 10 mPa.s at 20° C.

Furthermore, the ink composition has a surface tension of 45 mN/m or less, and preferably ranging from 25 to 45 mN/m.

Processes for preparing the ink composition of the invention include, for example, a process of thoroughly mixing and dissolving the respective ingredients, filtering the resulting solution under pressure through a membrane filter having a pore size of 0.8 μm, and then, conducting deaeration treatment with a vacuum pump to prepare the ink composition.

The recording process of the invention using the ink composition described above will be described below. As the recording process of the invention, an ink jet recording system of ejecting the ink composition as droplets through minute nozzles and depositing the droplets onto a recording medium to perform printing is especially suitably used. However, it goes without saying that the process is also usable for applications such as general writing materials, recorders and pen plotters.

As the ink jet recording system, any known system can be used. In particular, it is possible to perform excellent image recording in a process in which the droplets are ejected utilizing vibration of an electrostrictive element (a recording process using an ink jet head which forms the droplets of the ink composition by mechanical deformation of an electrostrictive element) and a process utilizing thermal energy.

EXAMPLES

The present invention will be illustrated in greater detail with reference to the following Examples and Comparative Example, but the invention should not be construed as being limited thereto.

Examples 1 to 12 and Comparative Example 1

Ink compositions of Examples 1 to 12 and Comparative Example 1 were each prepared by mixing and dissolving respective ingredients at compounding ratios shown in Table 1, followed by filtration under pressure through a 1-μm membrane filter. The values of the respective ingredients of the ink composition shown in Table 1 indicate percents by weight of the respective ingredients based on the total amount of the ink composition, and the balance is water.

For a colorant in Examples and Comparative Example, there was used as a compound represented by the following formula (2) as an example of the compound represented by formula (1) (and the salt thereof) was used as M dye 1.

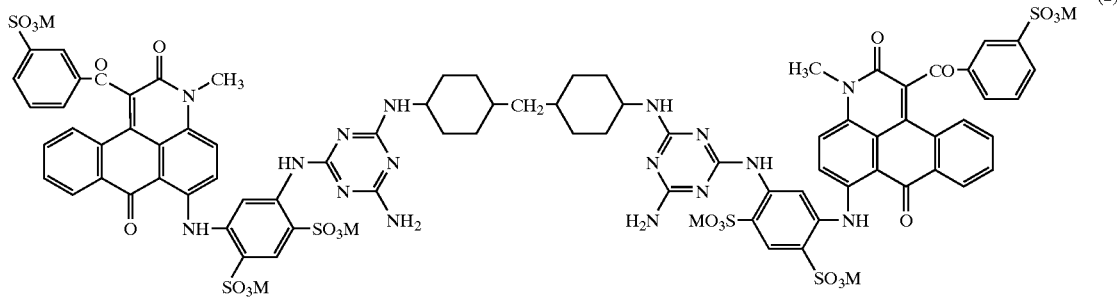

(2)

M=$NH_4$ or Na
($NH_4$ and Na are present in the compound in a molar ratio of 1:1)

TABLE 1

|  |  | Example | | | | | | | | | | | | Comp. Ex. |
|---|---|---|---|---|---|---|---|---|---|---|---|---|---|---|
|  |  | 1 | 2 | 3 | 4 | 5 | 6 | 7 | 8 | 9 | 10 | 11 | 12 | 1 |
| Colorant | M dye 1 | 2 | 2 | 2 | 2 | 2 | 2 | 2 | 2 | 2 | 2 | 2 | 4 | 2 |
| Organic | Glycerol | 10 | 9 | 10 | 10 | 10 | 10 | 10 | 9 | 10 | 10 | 10 | 9 | 10 |

TABLE 1-continued

|  |  | Example 1 | 2 | 3 | 4 | 5 | 6 | 7 | 8 | 9 | 10 | 11 | 12 | Comp. Ex. 1 |
|---|---|---|---|---|---|---|---|---|---|---|---|---|---|---|
| Solvent | Triethylene glycol | 3 | 4 | 3 | 4 | 3 | 3 | 3 | 6 | 6 | 6 | 3 | 3 | 9 |
|  | 2-Pyrrolidone | 2 | 2 | 2 | 1.5 | 2 | 2 | 2 | 3 | 2 | 2 | 2 | 1.5 | 3 |
|  | Olfin E1010 (manufactured by Nissin Chemical Industry Co., Ltd.) | 1 | 1 | 1 | 1 | 1 | — | 1 | 1 | 1 | 1 | 1 | 1 | 1 |
|  | Olfin STG (manufactured by Nissin Chemical Industry Co., Ltd.) | — | — | — | — | — | 0.3 | — | — | — | — | — | — | — |
|  | Triethylene glycol monobutyl ether | 10 | 10 | 10 | 10 | 10 | 10 | — | 10 | 10 | 10 | 10 | 10 | 10 |
|  | Diethylene glycol monobutyl ether | — | — | — | — | — | — | 10 | — | — | — | — | — | — |
| Alkali | Triethanolamine | 0.6 | 0.6 | 0.6 | 0.6 | 0.6 | 0.6 | 0.6 | 0.6 | 0.6 | 0.6 | 0.6 | 0.6 | 0.6 |
|  | Sodium hydroxide | — | — | — | — | — | — | — | — | — | — | 0.93 | — | — |
|  | Lithium hydroxide (monohydrate) | 1 | 0.9 | 0.9 | 1.22 | — | 1 | 0.9 | 0.5 | 0.45 | 0.45 | — | 1 | — |
| Moisture Resistance Improver | 2-Naphthoic acid | 4 | — | — | — | — | — | — | 2 | — | — | 4 | 4 | — |
|  | 3-Hydroxy-2-naphthoic acid | — | 4 | — | — | — | — | — | — | 2 | — | — | — | — |
|  | 6-Hydroxy-2-naphthoic acid | — | — | 4 | — | — | — | — | — | — | 2 | — | — | — |
|  | 4-Hydroxybenzoic acid | — | — | — | 4 | — | — | — | — | — | — | — | — | — |
|  | Sodium 2-naphthoate | — | — | — | — | 4 | — | — | — | — | — | — | — | — |
|  | 1-Naphthoic acid | — | — | — | — | — | 4 | — | — | — | — | — | — | — |
|  | 2-Hydroxy-1-naphthoic acid | — | — | — | — | — | — | 4 | — | — | — | — | — | — |
| Preservative | Proxel XL-2 (manufactured by Avecia) | 0.3 | 0.3 | 0.3 | 0.3 | 0.3 | 0.3 | 0.3 | 0.3 | 0.3 | 0.3 | 0.3 | 0.3 | 0.3 |
| Other | Water | Bal. | Bal. | Bal. | Bal. | Bal. | Bal. | Bal. | Bal. | Bal. | Bal. | Bal. | Bal. | Bal. |

Unit: % by weight

Printing of Printed Matter

Each of the ink compositions of Examples 1 to 12 and Comparative Example 1 was loaded into an exclusive cartridge (magenta chamber) of an ink jet printer Stylus Color 880 (manufactured by Seiko Epson Corporation), and printing was performed by the use of the printer on a recording medium exclusive to ink jet printing (PM photographic paper manufactured by Seiko Epson Corporation, type: KA420PSK) in the following manner.

Evaluation of Light Resistance

Printing was performed, using the above-mentioned cartridge and adjusting the duty so that the OD (optical density) value fell in the range of 0.9 to 1.1. The resulting printed matter was allowed to stand in an environment of ordinary temperature and humidity protected from the direct sunlight for one hour, and then, the light resistance of the resulting recorded matte was evaluated under the following conditions.

Using a fluorescent fade meter SFT-11 (manufactured by Suga Test Instruments Co., Ltd.), the recorded matter was irradiated under the conditions of 24° C. and 60% RH at an illuminance of 70,000 luxes for 7 days, 14 days, 21 days and 28 days, respectively.

The OD value (optical density) of the exposed sample was measured with a reflection densitometer (Spectrolino, manufactured by Gretag). Each measured value was substituted in the following equation, thereby obtaining the relict optical density (ROD) after fading:

$$ROD(\%) = (D_n/D_0) \times 100$$

($D_n$: OD after the irradiation test, $D_0$; OD before the irradiation test)

Then, each approximated curve was determined by plotting the irradiation period (days) on abscissa and the resulting ROD on the ordinate. The period required until the ROD had decreased to 70% was determined, and the light resistance was evaluated according to the following criteria:

A: The ROD does not decrease to 70% until 25 days have elapsed.

B: The period required until the ROD has decreased to 70% is from more than 20 days to 25 days or less.

C: The period required until the ROD has decreased to 70% is from more than 15 days to 20 days or less.

D: The period required until the ROD has decreased to 70% is from more than 10 days to 15 days or less.

E: The period required until the ROD has decreased to 70% is from more than 5 days to 10 days or less.

The results thereof are shown in Table 2.

Evaluation of Moisture Resistance

Using the above-mentioned cartridge, characters and outline characters were printed under such ejection conditions as to give an amount ejected of 1.5 to 2.2 mg per inch square. The resulting printed matter was dried in the environment of 25° C. and 40% RH for 24 hours, and then, allowed to stand in the environment of 40° C. and 85% RH for required periods of time. Bleeding of the dye (outline characters getting out of shape) was visually confirmed, and the moisture resistance was evaluated according to the following criteria:

A: Bleeding of the dye is scarcely observed.

B: Bleeding of the dye is slightly observed, and outlines of the characters somewhat get out of shape.

C: Bleeding of the dye is observed, and outlines of the characters get out of shape.

D: Bleeding of the dye is observed, and the characters are thickened and the outline characters are entirely dyed.

E: Bleeding of the dye is significantly observed, and the characters and the outline characters are illegible.

The results thereof are shown in Table 2.

Evaluation of Clogging

Using the above-mentioned cartridge, printing was continuously carried out for 10 minutes, and it was confirmed that the ink composition was normally ejected through all nozzles. Then, in order to accelerate a dry state in the nozzles, a recording head was dismounted from a head cap with the ink cartridge installed, and allowed to stand in the environment of 40° C. for 2 weeks. After standing, a cleaning operation was repeated until the ejection of all nozzles recovered equivalently to the initial ejection. The ease of recovery was evaluated according to the following criteria:

A: The ejection recovers equivalently to the initial ejection by repeating the cleaning operation 1 to 4 times.

B: The ejection recovers equivalently to the initial ejection by repeating the cleaning operation 5 to 8 times.

C: The ejection recovers equivalently to the initial ejection by repeating the cleaning operation 9 to 12 times.

D: The ejection does not recover by practical repetitions of the cleaning operation.

The results thereof are shown in Table 2.

TABLE 2

|  |  | Example |  |  |  |  |  |  |  |  |  |  | Comp. Example |
|---|---|---|---|---|---|---|---|---|---|---|---|---|---|
|  |  | 1 | 2 | 3 | 4 | 5 | 6 | 7 | 8 | 9 | 10 | 11 | 12 | 1 |
| Light Resistance |  | A | A | A | A | A | A | A | A | A | A | A | A | A |
| Moisture | 24 hours | A | A | A | A | A | A | A | A | A | A | A | A | A |
| Resistance | 72 hours | A | A | A | A | A | A | A | A | A | A | A | A | B |
| 40° C.*85% RH | 168 hours | A | A | A | A | A | A | A | B | B | B | A | B | C |
| Clogging Resistance |  | A | A | A | A | B | A | A | A | A | A | B | A | — |

In the evaluation of moisture resistance, the hydroxyl group-containing compounds showed a higher effect as the moisture resistance improver than the hydroxyl group-free compounds, although both were graded to the same class. Further, in the case of the naphthalene skeleton-containing compounds, the compound having a carboxyl group at the 2-position showed a higher effect than the compound having a carboxyl group at the 1-position.

As described above, according to the invention, the ink composition is allowed to contain the above-mentioned compound represented by formula (1) as the colorant, and the above-mentioned carboxyl group-containing aromatic compound, whereby the recorded matter using the ink composition is excellent in light resistance and moisture resistance, and the performance of recording using the ink composition achieves an excellent effect also in clogging resistance.

While the invention has been described in detail and with reference to specific embodiments thereof, it will be apparent to one skilled in the art that various changes and modifications can be made therein without departing from the spirit and scope thereof.

The present application is based on Japanese Application No. 2002-254611 filed Aug. 30, 2003, the contents thereof being herein incorporated by reference.

What is claimed is:

1. An ink composition comprising at least water; at least one member selected from compounds represented by the following formula (1) and/or salts thereof; and at least one member selected from carboxyl group-containing aromatic compounds and/or salts thereof:

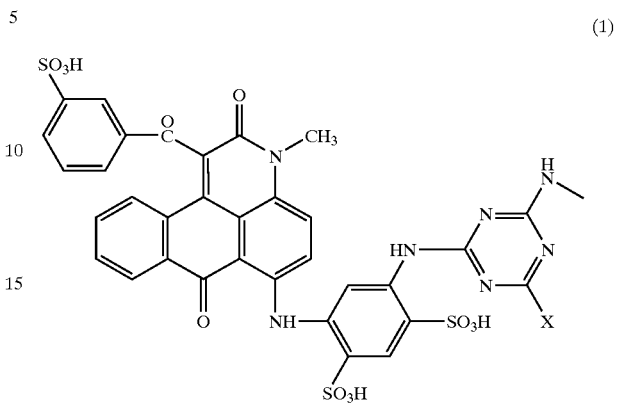

(1)

-continued

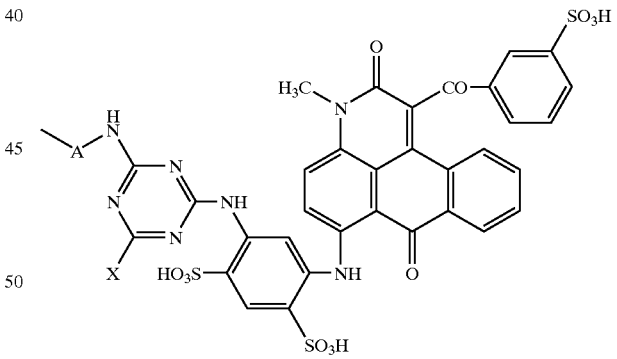

wherein A represents an alkylene group, a phenylene group-containing alkylene group or

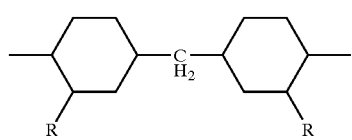

(R means hydrogen or alkyl) and X represents $NH_2$, OH or Cl.

2. The ink composition according to claim 1, wherein the compound represented by formula (1) and/or salt thereof are contained in an amount of 0.2 to 10% by weight based on the total amount of the ink composition.

3. The ink composition according to claim 1 or 2, wherein the carboxyl group-containing aromatic compound and/or salt thereof are contained in an amount of 0.2 to 10% by weight based on the total amount of the ink composition.

4. The ink composition according to any one of claims 1 to 3, wherein the content ratio of the compound represented by formula (1) and/or salt thereof to the carboxyl group-containing aromatic compound and/or salt thereof is from 4:1 to 1:10.

5. The ink composition according to any one of claims 1 to 4, wherein the carboxyl group-containing aromatic compound and/or salt thereof is a naphthalene skeleton-containing compound and/or a salt thereof.

6. The ink composition according to claim 5, wherein the naphthalene skeleton-containing compound and/or salt thereof is a compound having a carboxyl group at the 2-position and/or a salt thereof.

7. The ink composition according to claim 6, wherein the compound having a carboxyl group at the 2-position and/or salt thereof is at least one of 2-naphthoic acid, 3-hydroxy-2-naphthoic acid, 6-hydroxy-2-naphthoic acid, 4-hydroxybonzoic acid, 6-methoxy-2-naphthoic acid and salts thereof.

8. The ink composition according to any one of claims 5 to 7, wherein the salt of the carboxyl group-containing aromatic compound is a lithium salt.

9. The ink composition according to claim 8, wherein the carboxyl group-containing aromatic compound and/or salt thereof is lithium 2-naphthoate, lithium 3-hydroxy-2-naphthoate, lithium 6-hydroxy-2-naphthoate, lithium 4-hydroxybenzoate or lithium 6-methoxy-2-naphthoate.

10. The ink composition according to any one of claims 1 to 9, further comprising a nonionic surfactant.

11. The ink composition according to claim 10, wherein the nonionic surfactant is an acetylene glycol-based surfactant.

12. The ink composition according to claim 10 or 11, wherein the nonionic surfactant is contained in an amount of 0.1 to 5% by weight based on the total amount of the ink composition.

13. The ink composition according to any one of claims 1 to 12, further comprising a penetration accelerator.

14. The ink composition according to claim 13, wherein the penetration accelerator is a glycol ether.

15. The ink composition according to any one of claims 1 to 14, having a pH of 8.0 to 10.5 at 20° C.

16. The ink composition according to any one of claims 1 to 15, which is used in an ink jet recording process.

17. The ink composition according to any one of claims 1 to 16, which is a magenta ink composition.

18. An ink jet recording process comprising ejecting a droplet of an ink composition, and depositing the droplet onto a recording medium to perform printing, wherein the ink composition is one according to any one of claims 1 to 17.

19. Recorded matter recorded using an ink composition according to any one of claims 1 to 17.

* * * * *